United States Patent [19]

Emoto et al.

[11] Patent Number: 5,387,423
[45] Date of Patent: Feb. 7, 1995

[54] LOW CALORIE FOOD MATERIAL AND METHOD OF MANUFACTURING THE SAME

[75] Inventors: Mitsuo Emoto, Otsu; Masatoshi Mizuno, Shiga; Sadaichi Takagi, Otsu; Tetsuya Akazawa, Otsu; Sadao Fujii, Otsu; Madoka Murai, Kyoto; Yoshihito Nakai, Osaka, all of Japan

[73] Assignee: Otsuka Foods Co., Ltd., Osaka, Japan

[21] Appl. No.: 95,001

[22] Filed: Jul. 23, 1993

[30] Foreign Application Priority Data

| Jul. 24, 1992 | [JP] | Japan | 4-198712 |
| Jul. 24, 1992 | [JP] | Japan | 4-198720 |
| Oct. 9, 1992 | [JP] | Japan | 4-271907 |
| Dec. 28, 1992 | [JP] | Japan | 4-348591 |
| Dec. 28, 1992 | [JP] | Japan | 4-348597 |
| Feb. 2, 1993 | [JP] | Japan | 5-015358 |

[51] Int. Cl.⁶ .................. A23L 1/0522; A23L 1/0534
[52] U.S. Cl. .................. 426/104; 426/573; 426/578; 426/658; 426/804
[58] Field of Search .............. 426/104, 658, 573, 578, 426/804

[56] References Cited

U.S. PATENT DOCUMENTS

| 3,628,966 | 12/1971 | Katsuya et al. | 426/104 |
| 3,679,658 | 7/1972 | Yueh et al. | 426/104 |
| 4,325,976 | 4/1982 | Harrow | 426/104 |
| 4,521,436 | 6/1985 | Lou et al. | 426/104 |
| 4,963,383 | 10/1990 | Nozaki et al. | 426/573 |
| 5,049,401 | 9/1991 | Harada et al. | 426/573 |

FOREIGN PATENT DOCUMENTS

| 57-54571 | 4/1982 | Japan . |
| 59-196062 | 11/1984 | Japan . |
| 60-227657 | 11/1985 | Japan . |
| 61-278501 | 12/1986 | Japan . |
| 63-66180 | 10/1987 | Japan . |
| 62-59550 | 11/1987 | Japan . |
| 69198951 | 8/1988 | Japan . |
| 372856 | 3/1991 | Japan . |
| 3164147 | 7/1991 | Japan . |

*Primary Examiner*—Jeanette Hunter
*Attorney, Agent, or Firm*—Sughrue, Mion, Zinn, Macpeak & Seas

[57] ABSTRACT

The invention presents a low calorie food material in dry granular state containing a starch such as processed starch, and a dextrine, a konjak mannan or other gelling agent, and a cellulose powder or other white turbid matter.

The food material becomes, when water is added, a rice-like food possessing the same appearance and properties as cooked rice.

11 Claims, 2 Drawing Sheets

LOW CALORIE FOOD MATERIAL AND METHOD OF MANUFACTURING THE SAME

BACKGROUND OF THE INVENTION

The present invention relates to a low calorie food material and a method of manufacturing the same, and more particularly to an artificial rice material which becomes like a rice-like food of low calorie and high food fiber content, having properties and appearance like cooked rice, and method of manufacturing the same.

Recently, in Japan, due to the increasing trend of obesity, related adult diseases, and diet, the eating life is changing, and the rice consumption tends to decrease, but still the rice is the main food today. However, the rice is high in calorific value, and too much is taken unknowingly, or those on diet fall in a dilemma by taking too much calorie when desired to have a more feel of satisfaction. Moreover, for patients with allergic diseases or renal disorder, taking of rice may not be preferred.

On the other hand, as artificial rice, first the enriched rice was proposed by adding extra portion of vitamin $B_1$ which is insufficient in rice, but it was no popular because of its color, etc. Further, the surface of the rice was treated by gelation in order to improve the taste of the rice deteriorated by long-term storage, or instant rice and retort rice were prepared by seeking the handiness. In these products, the surface was too smooth, and there were such various problems in the eating sensation that biting reaction was poor.

The Japanese Patent Publication No. 70461/1991 discloses a granular dry gel obtained by heating and gelling water dispersion sol containing a refined powder of konjak and a starch, and drying the produced water-containing gel. It is disclosed that when water is added to this dry gel and boiled, water-containing gel possessing both konjak jelly (devil's tongue)-like property and rice-like eating feel is obtained, but it is far from artificial rice in both appearance and eating sensation.

The Japanese Patent Publication No. 66180/1988 discloses a method of manufacturing dry gel by kneading a konjak mannan, a starch and the like to gel, and freezing, thawing and drying the produced gel, but it is nothing but dried konjak jelly, and not artificial rice.

Thus, artificial rice equally comparable with natural rice in both eating sensation and appearance is not available at the present.

SUMMARY OF THE INVENTION

It is hence a primary object of the invention to present a novel rice-like food material of lower calorie and higher food fiber content as compared with natural rice, presenting the eating sensation and appearance not different from those of natural rice, and a method of manufacturing the same.

As a result of intensive research, the present inventors succeeded in obtaining a food material as a new artificial rice conforming to the object, by using a starch, a dextrine, a gelling agent, and a white turbid matter at a proper rate.

Specifically, the invention presents a low calorie food material as dry granular matter containing starch, and 0 to 20 times of dextrine, 0.003 to 7 times of gelling agent, and 0.03 to 20 times of white turbid matter, to the starch weight.

The invention also presents a method of manufacturing a low calorie food material comprising the steps of extruding, and cutting a semi-solid matter possessing a composition of 1 to 30% by weight of starch, 20% by weight or less of dextrine, 0.1 to 7% by weight of gelling agent, 1 to 20% by weight of white turbid matter and 40 to 97% by weight of water to form a granular-shape, eluting the dextrine as required, gelling, and drying.

The food material of the invention presents, only by adding water, a texture similar to cooked rice (feel on teeth, biting feel, etc.).

The invention may be also a non-dried food material, and presents, in such a case, a rice-like low calorie food material comprising 1 to 30% by weight of starch, 0 to 20% by weight of dextrine, 0.1 to 7% by weight of gelling agent, 1 to 20% by weight of white turbid matter, and 40 to 97% by weight of water. More preferably, the invention presents a rice-like low calorie food material comprising 1 to 30% by weight of processed starch, 0 to 20% by weight of dextrine, 1 to 7% by weight of konjak mannan, 0.01 to 0.5% by weight of alkali agent, 1 to 20% by weight of powder cellulose, and 40 to 97% by weight of water, in which the weight of the powder cellulose exceeds 1.0 of the weight of konjak mannan.

The food material of the invention may contain food fibers not found in natural rice, and the original feature of low calorie is provided.

Still more, the invention presents a retort cooked rice prepared by the steps of adding and blending granular gel formed by using gelling agent to rice, adding water as required, putting the blend into a container that can be heated and sterilized, and heating and sterilizing, or processing in retort. The granular gel is preferably a food material similar to cooked rice obtained by extruding and cutting a semi-solid matter possessing a composition of starch of 1 to 30% by weight, dextrine of 20% by weight or less, gelling agent of 0.1 to 7% by weight, white turbid matter of 1 to 20% by weight and water of 40 to 97% by weight to form a granular-shape. The granular gel is preferred to possess a particle size nearly equal to the rice grain.

The retort cooked rice obtained in the invention possesses the following benefits. (1) Due to sufficiently heated and sterilized, it can be preserved for a long period. (2) There is no risk of presenting stickiness due to mutual adhesion of natural rice experienced in retort treatment of natural rice alone. (3) The produce taken out by unpacking the container possesses the appearance and texture similar to natural rice cooked in traditional cooker. (4) Cellulose not contained in natural rice may be contained, and the calorie is low.

As the granular gel formed into particle size nearly equal to rice grain by using gelling agent, the food material of the invention mentioned above may be presented as a practical example, but it is not limitative, and various granular matters possessing nearly same particle size as the rice grains obtained similarly by using the gelling agent used in manufacture of the above food material may be used, such as alginic acid gel balls, jellied ball of curdlan balls, commercially available granular konjak jelly, cut pieces of commercially available konjak jelly noodle.

DETAILED DESCRIPTION OF THE INVENTION

Figure 1:
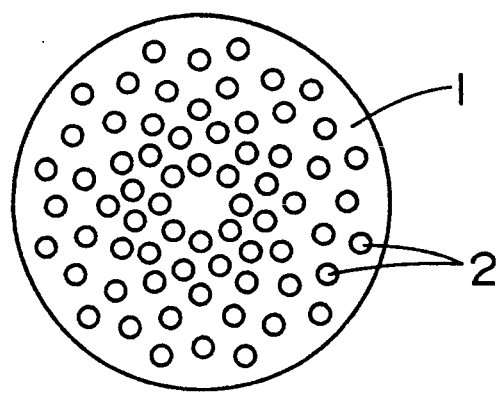
FIG. 1 is a front view of a die of an extruder suited to manufacture of the food material of the invention.

The starch used in the invention is not particularly limited, and there may be used various materials such as natural starch and processed starch hitherto used in food. Examples of the starch include rice starch, corn starch, wheat starch, barley starch, waxy cornstarch, sugar starch, potato starch, and other natural starches; grain powder containing these starches; high amylose starch, crosslinked starch, substitutional starch, thin boiling starch, acetate modified starch, hydroxyalkyl starch, alpha-starch, and other processed starches combining the processes either alone or in combination. In particular, processed starches obtained by chemical treatment of carboxyl group contained in crosslinked starch, substitutional starch, thin boiling starch, acetate modified starch, hydroxyalkyl starch and other starch by esterification or etherification are preferred. In the processed starches, those having the peak viscosity of Brabender viscosity (by viscometer of Brabender) of 600 to 800 Bu are most preferable. Especially, the processed starch of which Brabender viscosity is maintained more than 500, even if stored for 4 hours or more at 90° C., is preferred.

The content of starch used in the invention may be properly selected depending on the desired appearance, shape, and properties of the rice-like food obtained by adding water, and usually the content of starch in the granular matter containing water, that is, the content of starch of the whole amount of manufacturing materials of rice-like food containing water is about 1 to 30% by weight, or preferably about 10 to 20% by weight.

As dextrine, any substance soluble in water may be used, and usually the dextrine equivalent (DE) of about 10 to 40, or preferably about 20 to 30 may be suited. The dextrine is used in a range of 20 times or less, preferably about 0.16 to 10 times of the weight of the starch used. The dextrine is used for forming a porous structure by eluting from the granule in the process of manufacture, thereby to look more like natural cooked rice when water is added. Therefore, the dextrine is not absolutely required, but without using, it does not affect the quality of the artificial rice material of the invention itself.

The gelling agent is not particularly limited, too, and any material used in food processing field may be used. Both gelling agents to gel by bivalent cation and to gel by heating are included, and they may be used either alone or in combination.

The gelling agent to gel by bivalent cation includes, for example, pectic acid, pectic alkaline salt, carrageenan, alginic acid, alginic alkaline metal salt, low methoxy pectic acid, and its alkaline salt. The gelling agent to gel by heating includes, for example, gelatin, albumen, konjak refined powder, konjak mannan, caseine, gellan gum, gum arabic, gum guaiac, locust bean gum, and agar. In the invention, as the gelling agent, it is particularly preferred to use konjak refined powder or konjak mannan and other gelling agent in combination, and at this time the content of konjak refined powder or konjak mannan is preferred to be 50% by weight or more of the total gelling agent.

In the case of the combination of konjak mannan and other gelling agent such as locust bean gum, locust bean gum is contained at 0.5 to 6% by weight at solid (dry state), and in the cooked rice state (swelling state with water), 0.1 to 1.2% by weight.

Furthermore, the gelling agent comprising the combination of one gelling by heating such as konjak mannan with an alkaline matter is preferably used. The alkaline matter used herein includes, for example, calcium hydroxide, sodium carbonate, potassium carbonate, sodium hydrogencarbonate, monosodium phosphate, disodium phosphate, and eggshell calcium, and the content of such alkaline matter may be selected in a range of 0.01 to 0.5% by weight. In combination of preferred konjak mannan and alkaline matter, the content may be selected in a range of about 1 to 7% by weight of total food material weight, or preferably about 0.3 to 3% by weight.

The gelling agent may be used in a range of 0.003 to 7 times, preferably about 0.01 to 3 times of the starch weight. When the particularly preferred konjak mannan is used, it may be 0.003 to 7 times, preferably about 0.1 to 3 times of the starch weight.

When using the gelling agent to gel by bivalent cation, the rice-like food obtained in the invention further contains bivalent metal ions. As the bivalent metal ions, those capable of forming a gel together with the gelling agent and free from causing problem in food sanitation may be used, and ions such as calcium, magnesium or the like are preferred from the viewpoint of taste. As a compound containing bivalent metal ions include, for example, at least one of water soluble bivalent metal salt, such as calcium chloride, calcium lactate, baked eggshell calcium, baked oyster shell calcium, and other calcium salts; and magnesium chloride, magnesium lactate, can be used. The content of the bivalent metal ions may be usually in a range of 1 times or less, preferably 0.006 times to 0.5 times, as bivalent metal salt, of the starch weight.

The white turbid matter is added for the purpose of obtaining the white turbid appearance of rice and as food fiber, and in particular the fine powder ground by physical or chemical process is preferred, and preferable examples include, among others, cellulose powder passing about 60 mesh screen with average polymerization degree of 100 to 300, and cellulose powder with polymerization degree of 100 or less (Japanese Unexamined Patent Publication Nos. 212231/1982, 219333/1984, 211342/1986, 138538/1987, 240302/1987, 1152130/1991, 163135/1991, Japanese Patent Publication Nos. 19921/1985, 30220/1987, 44763/1988, 2012494/1992, etc.). The preferred cellulose powder has a particle diameter of 6 $\mu$m or less, more preferably 6 to 0.3 $\mu$m. As a result, the cellulose powder brings about not only the effect of giving the white turbid appearance and the effect of adding food fiber, but also the effects of improving the water-retaining property of the food material of the invention to avoid separation of water from the grains when water is added, thereby realizing the properties of cooked rice such as biting reaction and tooth feeling of cooked rice. The white turbid matter contains, aside from or together with the cellulose, bone powder, silk, talc, kaolin, eggshell powder, oyster shell powder, calcium carbonate and the like.

The other white turbid matter except for cellulose is contained in a range from 0.5 to 20% by weight at a solid rate, and in the cooked rice state(swelling state with water) in a range from 0.1 to 4% by weight. In combination with the cellulose, the other white turbid matter may be contained at 30% by weight or less at a solid rate in the total amount of mixture with the cellulose. If the total amount exceeds 30% by weight, eating sensation is lowered.

The other white turbid matter had preferably a particle diameter of 10 μm or less.

The content of the white turbid matter is 0.03 to 20 times, preferably about 0.06 to 5 times of the starch weight. However, when processed starch is used as the starch, konjak refined powder or konjak mannan as gelling agent, and when cellulose powder is used as white turbid matter, the cellulose powder must be added by more than 1.0 times, preferably more than about 1.5 times of the weight of konjak refined powder or konjak mannan, and if the ratio by weight is less than specified, these specific properties, that is, the appearance of cooked rice, eating sensation, and texture can be hardly given.

The food material of the invention may contain, aside from the ingredients described above, other various edible substances hitherto used in food properly if necessary as far as not adversely affecting the appearance, eating sensation and taste. Such substances may include vitamins, minerals, perfume, thickener, coloring matter, flavor, food fiber, and the like, and moreover various proteins, peptides, oils and fats, and seasonings (sugar, salt, soy sauce, and the like.) widely used as edible materials, which may be blended properly as required.

The manufacturing method of food material of the invention is described below.

First, specified amounts of the ingredients (except for bivalent metal salt) and a specified amount of water are mixed, agitated and kneaded to prepare a semisolid stock in the composition of 1 to 30% by weight of starch, 20% by weight or less of dextrine, 0.1 to 7% by weight of gelling agent, 1 to 20% by weight of white turbid matter, and 40 to 97% by weight of water. The operation of mixing, agitation and kneading may be executed according to the conventional methods by using proper rotary kiln, mixer and other kneading means. To raise the viscosity of the stock thus obtained, if necessary, a part of bivalent metal salt may be added, or the material may be properly heated. The viscosity of the obtained stock may be properly determined in consideration of the work in the subsequent extrusion process, and may be preferably in a range of about 10,000 to 100,000 cps. That is, it is adequate to possess the fluidity so as to be formed by the extruder, and the stiffness to retain the form after forming.

Thus obtained stock is charged into a proper extruder, and extruded at a proper speed, and is cut near the die discharge port to obtain pellets. In this case, any ordinary extruder may be used. The ordinary extruder is very convenient because the stock can be prepared in one process in the extruder.

In the invention, by particularly selecting the shape of the die and nozzle of the extruder, when water is added to the obtained food material being dry granules, the size and shape may be similar to the grains of cooked rice. For example, the die in the shape as shown in the accompanying drawings may be used preferably.

Figure 2:
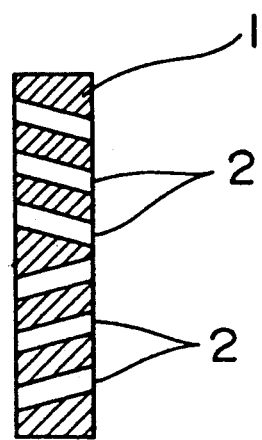
FIG. 2 is a sectional view of a die of an extruder suited to manufacture of the food material of the invention.
Figure 3:
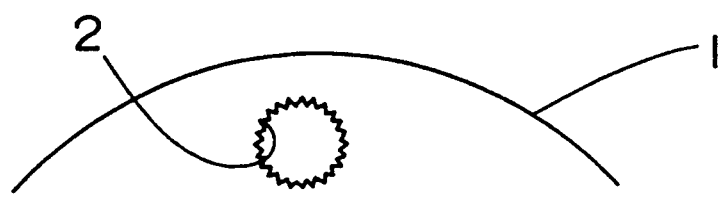
FIG. 3 is a partly magnified view of the die shown in FIG. 1.
Figure 4:
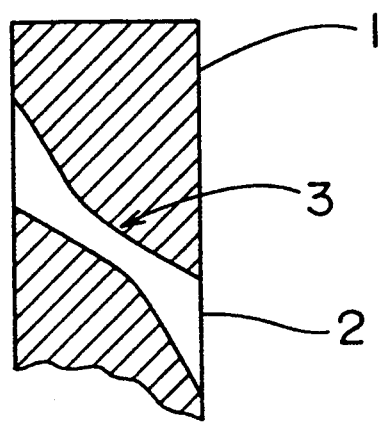
FIG. 4 is a partly magnified view of the die shown in FIG. 2.

FIG. 1 is a front view of a die 1 suited to manufacture of the food material conforming to the method of the invention, FIG. 2 is a side sectional view of the die 1, FIG. 3 is a partly magnified view of FIG. 1, and FIG. 4 is a partly magnified view of FIG. 2. The die 1 is furnished with multiple discharge nozzles 2.

The nozzles 2 of the die 1 are preferably in a shape tapered in the middle part 3 as shown in FIG. 4. By such tapering, fracture is formed in the pellet surface when pulse flow is applied in extrusion, and the pellet surface is corrugated in the lateral direction. Besides, by forming the shape of the nozzles 2 in a wavy circle instead of smooth circle (see FIG. 3), the pellet surface may be also corrugated in the longitudinal direction, and thus the appearance resembling the rice grains may be achieved by the pellets. Moreover, by slightly inclining the nozzles 2 in the extrusion direction (see FIG. 2 and FIG. 4), the pellets may be cut in a rhombic cylindrical form, so that the appearance resembling the rice grains may be achieved.

In the method of the invention, the pellets are immersed in water bath, and are gelled after eluting the dextrine in the pellets as required. The elution of dextrine is not limited to the pellet surface, but may extended to the inside of pellets. As a result, a porous portion may be formed in a pellet in the dry state, and when presenting to be eaten by adding water, the surface is more similar to that of rice. The dextrine elution in water bath is desired to be conducted as promptly as possible after cutting the stock. The elution operation in water bath is preferably performed for about 1 to 60 minutes at water bath temperature of about 0° to 100° C. Instead of water bath, moreover, running water may be used in elution operation.

The gelation operation following the elution should be preferably performed for about 5 to 30 minutes in a bivalent metal ion concentration of about 10 to 1000 mEq/liter, preferably about 300 to 800 mEq/liter. Besides, depending on selection of gelling agent, gelation by heating may be employed, instead of gelation by bivalent metal ions. This is executed by heating higher than the gelling temperature of the gelling agent, and heating may be executed by using proper heating means including warm water, hot water, steam, and hot air. Gelation is intended to achieve the same texture as natural rice when ingesting.

When it is intended to obtain the dry granular material, the obtained gel is presented for drying. The drying method is not particularly limited, and any known method may be employed, such as hot air drying, hot air fluidized drying, and vacuum drying. Drying is effected usually until the water content of the gelled granules may be 30% by weight or less, preferably 25% by weight or less, or more preferably 15% % by weight or less.

The dry granular material thus obtained may be presented to be eaten by adding water, and generally it is presented for ingestion by adding preferably about 8 parts by weight of water to 1 part by weight of the material and boiling for about 20 to 40 minutes, in the same manner as in ordinary rice cooking.

Besides, for example, by adding 10 parts by weight of polished rice and 20 parts by weight of water to 1 part by weight of the dry granular material of the invention, and boiling for 20 to 40 minutes, cooked rice in preferred ingestion state mixing the rice-like food derived from the material of the invention and polished rice at a rate of about 1:2 by weight is presented.

Thus obtained rice-like food possesses an excellent quality not substantially distinguished from natural rice in its appearance and eating sensation. Therefore, it may be used as low calorie artificial rice, instead of natural rice, in the food processing industry, for example as cooked rice effectively in various applications such as ochazuke, onigiri and sushi which are typical Japanese foods. Of course, as mentioned above, in combination with natural rice, it may be used in many applications.

The retort cooked rice in the invention may be prepared by adding and blending a proper amount of adequate granular gel such as rice-like food material obtained above to the rice, adding a proper volume of water, putting the blend into a proper container, and processing in retort.

As the rice, generally, steamed rice, which is obtained by boiling the natural uncooked rice by stream, is preferable, but it is not limitative, and an ordinary alpha-rice such as cooked rice may be used, or their state before heating and cooking, which is mixture of natural uncooked rice and water, may be used. In the case of mixture of uncooked rice and water, the ratio may be similar to that of ordinary rice cooking, and usually the ratio of about 1:1 (by weight) is preferable. The rice may also include processed rice and rice-like materials.

The adding and blending rate of the granular gel such as rice-like food material of the invention in the rice may be arbitrary determined and is not particularly defined, but generally it may be about at least 10% by weight, and by this addition and blending, stickiness of the rice material may be effectively prevented. This stickiness preventive effect is greater when the content of the granular gel is higher, but if too much is added, the texture becomes likely loose as compared with the natural cooked rice, and there is a strange feel from the cooked rice. Usually, the adding amount of the granular gel is in a range of 10 to 80% by weight, or preferably 20 to 60% by weight.

In succession, by putting the blend of the granular gel and the rice into ordinary appropriate container that can be sterilized by heating, such as can, heat-resistant plastic container, and retort pouch, and processing by retort sterilization or heating sterilization according to the known method, a desired product may be obtained.

As the container, as far as it can be heated and sterilized, there is no limitation in the material and shape, and ordinary metal (including foil), glass, plastics, and their laminates may be used. The shape may be ordinary circular, square, bag or the like.

The retort processing and heating processing may be done in the same condition as employed in the food processing industry. For example, in a temperature range of 105° to 130° C., processing may be done for about 10 to 60 minutes in the condition of ordinary pressure or pressurized state. At this time, saturated steam, high pressure hot water, steam or other vapor may be used as heat medium.

Thus obtained product possesses the long-term preserve property intrinsic to the retort food, and the granular gel added and blended to the rice is not substantially distinguished from the natural rice in appearance and eating sensation, and the granular gel magnificently prevents stickiness of the rice, and possesses an excellent quality as cooked rice, and by the addition and blending of the granular gel, moreover, cellulose may be supplemented, and the calorific value is low. Therefore, the retort rice of the invention, same as mentioned above, is effectively utilized in the food processing industry, for example, as cooked rice in various applications.

EXAMPLES

The invention is further described below by referring to some of examples, but the invention is not limited to them alone.

Example 1

The specified amounts of the following ingredients were homogeneously mixed in a mixer (model 20DMW manufactured by Sanei Seisakusho).

| (Ingredients) | (Parts by weight) |
| --- | --- |
| Starch | 22 |
| Cellulose (mean diameter of 1.7 μm) | 2 |
| Pectin | 2 |
| Dextrine | 20 |
| Water | 54 |

The homogeneously blended paste was extruded into a cylindrical form by using a screw extruder (model PX30 manufactured by FMI) having a hole of 3 to 4 mm in diameter at the outlet, and the extruded paste was cut into length of about 6 to 20 mm to obtain pellets.

The obtained pellets (mean diameter 3 mm × length 5 mm) were kept in the water for about 30 minutes, and then calcium chloride was charged in the water to obtain a 2% mixed solution, and the solution was left stand for about 20 to 40 minutes to allow to gel. Pellets were taken out of water, and white granular gel was obtained. The obtained get was dried for 60 minutes at 105° C. in a belt type hot air dryer, and the granular food material (mean diameter 1 mm × length 4 mm) of the invention with water content of about 10% by weight was obtained.

To 1 part by weight of the obtained food material sample, water was added by 8 parts by weight, and it was mixed with natural cooked rice at specific rates to prepare specimens, and its strangeness felt by ten panelists was compared with the control of 100% cooked rice. The specimens were presented to the panelists in the ascending order of the content of the material of the invention.

The obtained results are shown in Table 1.

TABLE 1

| Food Material (content) by weight | Cooked rice (content) % by weight | Different from control (Number of panelists) | |
| --- | --- | --- | --- |
| | | Not feel | Feel |
| 20 | 80 | 10 | 0 |
| 40 | 60 | 8 | 2 |
| 60 | 40 | 6 | 4 |
| 80 | 20 | 3 | 7 |
| 100 | 0 | 2 | 8 |

As known from the above result, when the material obtained in this example to which water was added, was added simply to cooked rice, the majority of the panelists did not feel strange, even if the majority of the content was not natural rice. Accordingly, it was known that the food material of this example presents a rice-like food having the eating sensation very similar to that of cooked rice.

In this test, cooked rice was used as the control, but without using the control, the food material to which water was added, was blended with ordinary rice at various rates, and was presented to panelists in actual meals to evaluate the strangeness in eating. The meal was presented in the same manner above, and ten panelists tasted.

The results are shown in Table 2.

TABLE 2

| Food Material (content) by weight | Cooked rice (content) % by weight | Different from control (Number of panelists) | |
|---|---|---|---|
| | | Not feel | Feel |
| 20 | 80 | 10 | 0 |
| 40 | 60 | 10 | 0 |
| 60 | 40 | 8 | 2 |
| 80 | 20 | 6 | 4 |
| 100 | 0 | 4 | 6 |

As shown in Table 2, when the mixture of sample and rice was presented as cooked rice in the course of an ordinary meal, the number of panelists feeling strange further decreased from the results in Table 1. It proves the food material of the invention presents a rice-like food possessing an eating sensation similar to cooked rice practically. Therefore, when cooked together with other material in soy sauce, or taken together with vegetables, fried food or the like, it is expected that an excellent quality not distinguished from the natural rice may be presented.

Example 2

The following ingredients were homogeneously mixed in a mixer.

| (Ingredients) | (Parts by weight) |
|---|---|
| Starch | 5 |
| Cellulose (mean diameter of 0.7 μm) | 5 |
| Konjak refined powder | 2 |
| Dextrine | 5 |
| Water | 82.5 |
| Calcium hydroxide | 0.5 |

The homogeneously blended paste was extruded cylindrically by a screw extruder (model PX30 manufactured by FMI) having a hole of 3 mm in diameter at the outlet, and the extruded paste was cut in length of about 5 mm to obtain pellets.

The obtained pellets (mean diameter 3 mm × length 5 mm) were put in water for about 30 minutes, and water temperature was then raised to 90° to 100° C., and the pellets were gelled. Taking out of water, white granular gel was obtained.

The obtained gel was dried for 60 minutes at 105° C. in a belt type hot air dryer, and granular food material (mean diameter 1 mm × length 4 mm) having water content of 10% by weight, was obtained.

It was presented for the panel test conforming to Example 1, and the same results as in the food material of the invention in Example 1 were obtained.

Example 3

As the processed starch, a commercially available product of processed starch derived from waxy cornstarch having Brabender peak viscosity of 600 was used together with the following ingredients, and the food material of the invention was prepared in the procedure below.

| (Ingredients) | (Parts by weight) |
|---|---|
| Processed starch | 180 |
| Cellulose powder (mean diameter of 5.5 μm) | 40 |
| Konjak mannan | 20 |
| Locust bean gum | 15 |
| Dextrine | 20 |
| Water | 1210 |
| 0.6% Calcium hydroxide solution | 100 |

To 450 pats by weight of water, 20 parts by weight of dextrine, 60 parts by weight of processed starch, and 15 parts by weight of locust bean gum were added, and mixed for 10 minutes by homogenizing mixer at 10,000 rpm to disperse the ingredients in water, and a dispersion liquid obtained by dispersing 125 parts by weight of processed starch and 20 parts by weight of konjak mannan in 400 parts by weight of chilled water was added to the dispersion liquid obtained above, and mixed and dispersed.

After mixing and dispersing, a mixture of 40 parts by weight of cellulose powder and 260 parts by weight of water was added and mixed to the obtained dispersion liquid. The mixture thus obtained was allowed to swell for 60 minutes at room temperature, and 100 parts by weight of 0.6% calcium hydroxide was added and mixed to gel.

Thus obtained homogeneous paste mixture was extruded from a perforated plate, and cut in length of about 5 mm, and the cut pellets were granulated to obtain granules of about 3 mm in diameter and about 5 mm in length. By heating for 30 minutes at 85° C., washing in water, draining, and drying in a same manner as in Example 1, the food material having water content of 10% by weight was obtained.

By the panel test conforming to Example 1, it was evaluated to present rice-like food possessing an excellent eating sensation without feeling any strangeness from the natural cooked rice, similar to the food material obtained in Example 1.

The color was compared between the food material thus obtained and the natural cooked rice. As the natural cooked rice for the control, 150 g of Koshihikari brand rice was cooked in 210 g of water, and mixed well right after cooking and ground to paste by mill. The food material was similarly ground to paste by mill, and presented for color measurement.

The samples were measured by color difference meter (model SAZ-Omega 90 manufactured by Nippon Denshoku Kogyo K. K.).

Obtained results are shown in Table 3.

TABLE 3

| Color | Food material | Natural cooked rice |
|---|---|---|
| Y | 49.03 | 54.24 |
| X | 47.61 | 52.29 |
| Z | 56.85 | 55.87 |
| L | 70.02 | 73.64 |
| a | −1.19 | −2.17 |
| b | 0.94 | 6.63 |
| dL | −27.46 | −23.83 |
| da | −1.00 | −1.92 |
| db | 1.11 | 6.80 |
| dE (H) | 27.50 | 24.86 |
| L* | 75.46 | 78.60 |
| a* | −1.28 | −2.30 |
| b* | 1.02 | 7.32 |
| dL* | −22.57 | −19.44 |
| da* | −1.09 | −2.12 |
| db* | 1.18 | 7.48 |
| dE (ab) | 22.63 | 20.94 |

Furthermore, in the obtained food material and the natural cooked rice (rice after cooking), properties (viscoelasticity, cutting force) were measured by rheometer in the following conditions.

Instrument: Rheometer manufactured by Fudo Kogyo K. K

| Conditions: | |
|---|---|
| Meter sensitivity | 200 mK |
| Sample table speed | 20 mm/min |
| Recorder speed | 30 mm/min |
| Adapter | Piano wire (for cutting stress) |

As a result, the cutting force of the food material and the natural cooked rice was both 25 mK, and the charts were hardly distinguishable.

Example 4

The following ingredients were homogeneously mixed by a mixer (model 20DMW of Sanei Seisakusho).

| (Ingredients) | (Parts by weight) |
|---|---|
| Glutinuou rice powder | 22 |
| Cellulose (mean diameter of 3.5 $\mu$m) | 10 |
| Curdlan | 8 |
| Dextrine | 2 |
| Water | 58 |

The homogeneously blended paste was extruded cylindrically by a screw extruder (model PX30 manufactured by FMI) having a hole of 3 to 4 mm in diameter at the outlet, and the extruded paste was cut in length of about 6 to 10 mm, and pellets were obtained. Obtained pellets (mean diameter 3 mm×length 5 mm) were put in water for about 30 minutes at 80° to 95° C. to gel. Pellets were taken out of water, and white granular gel was obtained. The obtained gel was dried for 60 minutes at 105° C. by using belt type hot air dryer, and a granular food material (mean diameter 1 mm×length 4 mm) with water content of about 10% by weight was obtained.

Examples 5 and 6

Food materials were manufactured in the same manner as in Example 3, except that commercially available processed starch derived from tapioca starch with Brabender peak viscosity of 700, and commercially available processed starch derived from corn starch with Brabender peak viscosity of 800 were used as processed starch.

By the panel test conforming to Example 1, it was evaluated that the obtained materials to presents a rice-like food possessing an excellent eating sensation without feeling any strangeness from the natural cooked rice, similar to the food material obtained in Example 1.

Examples 7 and 8

Food materials were manufactured in the same manner as in Example 3, except that the content of the cellulose powder was changed from 40 parts by weight to 30 parts by weight and 60 parts by weight, respectively.

By the panel test conforming to Example 1, the obtained materials were evaluated to present rice-like food possessing an excellent eating sensation without feeling any strangeness from the natural cooked rice, same as the food material obtained in Example 1. By their comparison, the white turbidity was slightly insufficient in the powder cellulose content of 30 parts by weight as compared with the material of 60 parts by weight, and it was apparently distinguished from the natural rice.

Example 9 (Preparation of retort rice)

An aluminum pouch was filled with 40 parts by weight of non-dry white granular gel obtained in Example 1 and 60 parts by weight of steamed rice, sealed, and heated under pressure for 20 minutes at 120° C. to sterilize (retort processing), and a retort rice product was prepared.

It was heated and cooked in a microwave oven, and the content taken out by opening the aluminum pouch was free from stickiness due to adhesion of rice grains, and presented the same appearance as cooked rice, even after cooked, and the result of eating test was not distinguished from the cooked rice.

On the contrary, the comparative retort rice similarly prepared by filling the cooked rice in an aluminum pouch, was after heating and cooking similarly, very sticky like jelly due to mutual adhesion of rice grains.

Examples 10 and 11 (Preparation of rices)

A bag made of a laminate of aluminum foil and heat resistant thermoplastic film was packed with 20 parts by weight of the non-dry white granular gels obtained in Examples 2 and 3 and 80 parts by weight of steamed rice, and, after heat-sealing its opening, was heated under pressure for 20 minutes at 120° C. to be sterilized (retort processing), and a retort rice product was obtained.

It was heated and cooked in a microwave oven, and the content taken out by opening the bag was free from stickiness due to adhesion of rice grains, and presented the same appearance as cooked rice, even after cooked, and the result of eating test was not distinguished from the cooked rice.

On the contrary, the retort rice similarly prepared by filling the steamed rice in a same bag was, after heating and cooking similarly, sticky due to mutual adhesion of rice grains.

Example 12 (Preparation of retort rices)

In the same as in Example 10, a tin-plate can of No. 5 type was filled with 20 parts by weight of the non-dry white granular gel and 80 parts by weight of steamed rice, and was enclosed by evacuating, and sterilized in retort (10 minutes at 125° C.), and a retort rice product was manufactured.

It was heated and cooked in a microwave oven, and the content taken out by opening the can was free from stickiness due to adhesion of rice grains, and presented the same appearance as cooked rice, even after cooked, and the result of eating test was not distinguished from the cooked rice.

Examples 13 to 17 (Preparation of retort rices)

A bag made of a laminate of aluminum foil and heat resistant thermoplastic film was packed with 50 parts by weight of the non-dry white granular gel obtained in Examples 3, 5 to 8 and 50 parts by weight of steamed rice, and, after heat-sealing its opening, was heated under pressure for 20 minutes at 120° C. to be sterilized (retort processing), and a retort rice product was obtained.

It was heated and cooked in a microwave oven, and the content taken out by opening the bag was free from stickiness due to adhesion of rice grains, and presented the same appearance as cooked rice, even after cooked, and the result of eating test was not distinguished from the cooked rice.

On the contrary, the retort rice similarly prepared by filling a same bag with the steamed rice was, after heating and cooking similarly, sticky due to mutual adhesion of rice grains.

Examples 18 to 21 (Preparation of retort rices)

Using the following granular gels instead of the food material obtained in Example 4, they were heated and cooked in a microwave oven in the same manner as in Example 13, and retort rice products were prepared.

Granular gels used in examples

Example 18: Alginic acid gel ball (3 mm in diameter)

Example 19: Jellied ball of curdlan (4 mm in diameter)

Example 20: Konjak jelly granule ("Puti-kon", 4 mm in diameter)

Example 21: Konjak jelly noodle cut piece (2 mm×5 mm)

Alginic acid gel ball was obtained by extruding and forming 22 parts by weight of starch, 2 parts by weight of cellulose, 2 parts by weight of sodium alginate, 2 parts by weight of dextrine and 78 parts by weight of water, and charging into 2% calcium chloride solution to gel, Curdlan gel ball was obtained by extruding and forming a mixture of 4 parts by weight of curdlan and 96 parts by weight of water, and charging in the condition of 95° C. to gel. The konjak jelly granule ("Puti-kon" 4 mm in diameter) was a commercially available product used as it was, and konjak jelly noodle cut piece was prepared by cutting the commercially available konjak jelly noodle into specified shape.

The retort rice products obtained by using these granular gels were free from stickiness when the content was taken out by opening the bag and was observed for mutual adhesion of rice grains, and excellent in loosening effect, but a slight contraction of grains was noted due to separation of water from the granular gels.

These disclosures of Japanese Patent Applications Serial No. 198712/1992, filed on Jul. 24, 1992; No. 198720/1992, filed on Jul. 24, 1992; No. 271907/1992, filed on Oct. 9, 1992; No. 348591/1992, filed on Dec. 28, 1992; No. 348597/1992, filed on Dec. 28, 1992; No. 15358/1993, filed on Feb. 2, 1993 is incorporated herein by reference.

What is claimed is:

1. A low calorie food material comprising a granular matter obtained by gelling granular material with an alkali agent, followed by heating, wherein said granular material comprises processed starch having a peak viscosity of Brabender viscosity of 600 to 800 Bu, 0.003 to 7 times of a gelling agent selected from the group consisting of a refined powder of konjak and konjak mannan, and 0.03 to 20 times of a white turbid matter comprising a cellulose powder, to the processed starch weight.

2. The low calorie food material of claim 1, wherein said white turbid matter comprises a combination of at least one ingredient selected from the group consisting of bone powder, silk, talc, kaolin, and cellulose.

3. A low calorie food material comprising a granular matter obtained by gelling granular material with an alkali agent, followed by heating, wherein said granular material comprises processed starch having a peak viscosity of Brabender viscosity of 600 to 800 Bu, 0.003 to 7 times of a gelling agent comprising a locust bean gum and a refined powder of konjak or konjak mannan, and 0.03 to 20 times of a white turbid matter comprising a cellulose powder, to the processed starch weight.

4. A low calorie food material comprising a granular matter obtained by gelling granular material, followed by heating, wherein said granular material comprises a processed starch, 0.003 to 7 times of a gelling agent comprising curdlan, and 0.03 to 20 times of a white turbid matter comprising cellulose powder, to the processed starch weight.

5. A low calorie food material, similar to rice, comprising 1 to 30% by weight of processed starch having a peak viscosity of Brabender viscosity of 600 to 800 Bu, 1 to 7% by weight of konjak mannan, 0.001 to 0.5% by weight of an alkali matter, 1 to 20% by weight of cellulose powder, and 40 to 97% by weight of water.

6. A method of producing a lower calorie food material, comprising the steps of:

extruding and cutting a semi-solid matter comprising processed starch having a peak viscosity of Brabender viscosity of 600 to 800 Bu, 1 to 7% by weight of konjak mannan, 0.01 to 0.5% by weight of an alkali agent, 1 to 20% by weight of cellulose powder, and 40 to 97% by weight of water to obtain a granular matter; and gelling said granular matter to obtain a granular gel.

7. A low calorie retort cooked rice comprising a blend of a granular gel obtained according to the method of claim 6, and rice, wherein said blend is placed into a heatable-sterilizable container and subjected to heat sterilization or retort treatment.

8. The retort cooked rice according to claim 7, wherein said granular gel possesses a grain size similar to the size of a rice grain.

9. A low caloric retort cooked rice comprising a granular gel formed by using a gelling agent, and rice, wherein the blend of the granular gel and the rice is filled into a heatable-sterilizable container, followed by heating, sterilization, or retort treatment, wherein said granular gel is the low caloric food material of claim 1.

10. The low calorie retort cooked rice of claim 9, wherein the granular gel is the low calorie food material of claim 6.

11. The retort cooked rice of claim 9, wherein the granular gel possesses a grain size nearly equal to a rice grain.

* * * * *